United States Patent Office 3,825,552
Patented July 23, 1974

3,825,552
THIAZOLE CARBAMATE PESTICIDES
John H. Davies, Boughton, and Royston H. Davis, Rainham, England, assignors to Shell Oil Company, New York, N.Y.
No Drawing. Filed Jan. 31, 1972, Ser. No. 222,370
Claims priority, application Great Britain, Feb. 10, 1971, 4,374/71
Int. Cl. C07d 91/32
U.S. Cl. 260—302 R    3 Claims

ABSTRACT OF THE DISCLOSURE

Thiazole carbamate derivatives of the formula

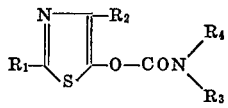

where $R_1$ is alkyl, alkylthio, alkoxy, or aryl; $R_2$ is hydrogen, alkyl optionally substituted by alkylthio or alkylenedioxy, alkylthio optionally substituted by cyano, alkoxy, or aryl; and $R_3$ and $R_4$ are hydrogen or alkyl, are useful as pesticides, particularly as insecticides and acaricides.

FIELD OF THE INVENTION

This invention relates to novel thiazole carbamate derivatives having pesticidal properties, to compositions containing them, and to their use as pesticides.

SUMMARY OF THE INVENTION

It has now been found that certain novel thiazole carbamate derivatives are useful as pesticides.

DESCRIPTION OF THE PREFERRED EMBODIMENTS

The present invention relates to thiazole carbamate derivatives of general formula

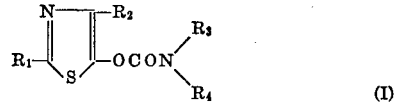

wherein $R_1$ is alkyl, alkylthio, alkoxy, or aryl; $R_2$ is hydrogen, alkyl alkylthioalkyl, alkylenedioxyalkyl, alkylthio, cyanoalkylthio, alkoxy, or aryl; $R_3$ is hydrogen or alkyl and $R_4$ is hydrogen or alkyl.

Preferred compounds having a high degree of pesticidal activity are those wherein $R_1$ is an alkyl, alkylthio or alkoxy group of 1–6 carbon atoms, for example, methyl, isopropyl, tert-butyl, methylthio or isopropoxy, or a phenyl group; $R_2$ is a hydrogen atom, an alkyl group of 1–6 carbon atoms optionally substituted by methylthio or ethylenedioxy, for example, methyl, propyl, isopropyl, sec-butyl, hexyl, methylthioethyl or ethylenedioxyethyl, an alkylthio group of 1–6 carbon atoms, for example methylthio, a cyanoalkylthio group of 2–7 carbon atoms, for example cyanoethylthio, an alkoxy group of 1–6 carbon atoms, for example isopropoxy, or a phenyl group; $R_3$ represents a hydrogen atom or an alkyl group of 1–6 carbon atoms, for example methyl, and $R_4$ represents an alkyl group of 1–6 carbon atoms, for example, methyl.

A particularly pesticidally active compound is 2-methyl-4-sec-butyl-1,3-thiazol-5-yl-N,N-dimethyl carbamate.

The thiazole carbamates of formula I are prepared by reacting a thiazolone of formula:

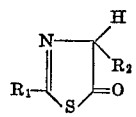

with a base and either with a carbamoyl halide of formula:

wherein Hal is a halogen, preferably chlorine, atom, or, when $R_3$ is a hydrogen atom and $R_4$ is an alkyl group, with an alkyl isocyanate of formula:

$$R_4NCO \qquad (IV)$$

where $R_4$ is as defined above. The base may be either an organic base for example a tertiary amine such as triethylamine or pyridine, or an inorganic base, for example an alkali metal hydride such as sodium hydride.

In certain cases it may be more convenient to use in the reaction phosgene and an amine of formula:

where $R_3$ and $R_4$ are as defined above in place of the carbamoyl halide or alkyl isocyanate.

The thiazolone starting materials of formula II may be prepared by any of the methods known from the chemical literature. A convenient method, which is illustrated in the examples below, comprises reacting an N-thioacyl acid derivative of formula:

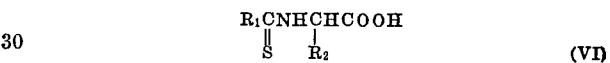

with phosphorus tribromide and liberating the thiazolone from the hydrobromide salt so formed using a suitable base, for example, sodium bicarbonate.

As mentioned above, the thiazole carbamates of the invention are of interest as pesticides and especially as insecticides and acaricides. In particular, the compounds exhibit direct and systemic activity against aphids. The invention includes therefore pesticidal compositions comprising a carrier or a surface-active agent, or both a carrier and a surface-active agent, and, as active ingredient, at least one thiazole carbamate of the invention. Likewise the invention includes also a method of combating insect pests at a locus which comprises applying to the locus a pesticidally effective amount of a thiazole carbamate or composition of the invention.

The term "carrier" as used herein means a solid or fluid material, which may be inorganic or organic and of synthetic or natural origin, with which the active compound is mixed or formulated to facilitate its application to the plant, seed, soil or other object to be treated, or its storage, transport or handling.

The surface-active agent may be an emulsifying agent or a dispersing agent or a wetting agent; it may be non-ionic or ionic.

Suitable solid carriers are natural and synthetic clays and silicates for example, natural silicas such as diatomaceous earths; magnesium silicates, for example, talcs; magnesium aluminum silicates, for example, attapulgites and vermiculites; aluminum silicates, for example kaolinites, montmorillonites and micas; calcium carbonates; calcium sulfate; synthetic hydrated silicon oxides and synthetic calcium or aluminum silicates; elements such as for example, carbon and sulfur; natural and synthetic resins such as for example, coumarone resins, polyvinyl chloride and styrene polymers and copolymers; solid polychlorophenols; bitumen, waxes such as for example, beeswax, paraffin, and chlorinated mineral waxes; and solid fertilizers, for example, superphosphates.

Examples of suitable fluid carriers are water, alcohols, such as for example, isopropanol, glycols; ketones such as for example, acetone, methyl ethyl ketone, methyl isobutyl ketone and cyclohexanone; ethers, aromatic hydrocarbons such as for example, benzene, toluene and xylene; petroleum fractions such as for example, kerosene, light mineral oils; chlorinated hydrocarbons, such as for example, carbon tetrachloride, perchloroethylene, trichloroethane, including liquified normally vaporous gaseous compounds. Mixtures of different liquids are often suitable.

The surface active agent may be an emulsifying agent or a dispersing agent or a wetting agent; it may be nonionic or ionic. Any of the surface-active agents usually applied in formulating herbicides or insecticides may be used. Examples of suitable surface-active agents are the sodium calcium salts of polyacrylic acids and lignin sulfonic acids; the condensation products of fatty acids or aliphatic amines or amides containing at least 12 carbon atoms in the molecule with ethylene oxide and/or propylene oxide; fatty acid esters of glycerol, sorbitan, sucrose or pentaerythritol; condensates of these with ethylene oxide and/or propylene oxide; condensation products of fatty alcohols or alkyl phenols for example, p-octylphenol or p-octylcresol, with ethylene oxide and/or propylene oxide; sulfates or sulfonates of these condensation products, alkali or alkaline earth metal salts, preferably sodium salts, of sulfuric or sulfonic acid esters containing at least 10 carbon atoms in the molecule, for example, sodium lauryl sulfate, sodium secondary alkyl sulfates, sodium salts of sulfonated castor oil, and sodium alkylaryl sulfonates such as sodium dodecylbenzene sulfonate; and polymers of ethylene oxide and copolymers of ethylene oxide and propylene oxide.

The compositions of the invention may be formulated as wettable powders, dusts, granules, solutions, emulsifiable concentrates, emulsions, suspension concentrates and aerosols. Wettable powders are usually compounded to contain 25, 50 or 75% by weight of toxicant and usually contain in addition to solid carrier, 3–10% by weight of a dispersing agent, and, where necessary, 0–10% by weight of stabilizer(s) and/or other additives such as penetrants or stickers. Dusts are usually formulated as a dust concentrate having a similar composition to that of a wettable powder but without a dispersant, and are diluted in the field with further solid carrier to give a composition usually containing ½–10% by weight of toxicant. Granules are usually prepared to have a size between 10 and 100 BS mesh (1.676–0.152 mm.), and may be manufactured by agglomeration or impregnation techniques. Generally, granules will contain ½–25% by weight toxicant and 0–10% by weight of additives such as stabilizers, slow release modifiers and binding agents. Emulsifiable concentrates usually contain, in addition to the solvent and, when necessary, co-solvent, 10–50% by weight per volume toxicant, 2–20% weight per volume emulsifiers and 0–20% weight per volume of appropriate additives such as stabilizers, penetrants and corrosion inhibitors. Suspension concentrates are compounded so as to obtain a stable, non-sedimenting, flowable product and usually contain 10–75% by weight of dispersing agents, 0.1–10% by weight of appropriate additives such as defoamers, corrosion inhibitors, stabilizers, penetrants and stickers, and as carrier, water or an organic liquid in which the toxicant is substantially insoluble; certain organic solids or inorganic salts may be dissolved in the carrier to assist in preventing sedimentation or as antifreeze agents for water.

Aqueous dispersion and emulsions, for example, compositions obtained by diluting a wettable powder or a concentrate according to the invention with water, also lie within the scope of the present invention. The said emulsions may be of the water-in-oil or of the oil-in-water type, and may have a thick "mayonnaise"-like consistency.

The compositions of the invention may also contain other ingredients, for example other compounds possessing pesticidal, particularly insecticidal, acaricidal, herbicidal or fungicidal, properties.

To further illustrate the novel products of the invention and the use of the novel products as pesticides, the following examples are provided. It should be understood that they are not to be regarded as limitations, as the teachings thereof may be varied as will be understood by one skilled in the art.

In the following examples, the structure of all the products was confirmed by elemental analysis.

EXAMPLE I 4-propyl-2-methylthio thiazol-5-yl-N-methylcarbamate (a) Preparation of 4-isopropyl-2-methylthio thiazol-5-one: Valine (11.7 grams) was dissolved in water (30 milliliters) containing potassium hydroxide (11.2 grams) and the solution was cooled to 10° C. Carbon disulphide (7.6 grams) was added to the solution and the mixture was stirred for 5 hours. Methyl iodide (14.7 grams) was added to the orange solution which was then cooled and stirred for a further one hour. The solution was acidified with concentrated hydrochloric acid (10 milliliters) and extracted with ether. The dried extracts were evaporated to give a yellow syrup which solidified on standing. The solid was recrystallized from a benzene/petroleum ether mixture. The pure intermediate (5.0 grams) was dissolved in benzene (50 milliliters) containing acetic anhydride (2.5 grams) and the solution was allowed to stand for 48 hours at 70° C. The solution was then washed with aqueous saturated sodium bicarbonate solution, dried and evaporated to leave the thiazolone as a yellow oil.

(b) Carbamoylation of 4 - isopropyl - 2 - methylthio thiazol-5-one: 4-isopropyl-2-methylthio thiazol-5-one (4 grams prepared as in (a)), methyl isocyanate (1.0 grams) and triethylamine (2 drops) were dissolved in dichloromethane (15 milliliters) and the solution was allowed to stand at room temperature for 16 hours. The solvent was then removed under reduced pressure and the residue chromatographed on silica gel eluting with dichloromethane followed by mixtures of dichloromethane and ether. The product was further purified by recrystallization from petroleum ether (boiling point 60–80° C.) to give the desired N-methylcarbamate as a white crystalline solid melting at 93–93.5° C.

EXAMPLE II 2-methyl-4-sec-butyl thiazol-5-yl N,N-dimethylcarbamate (a) Preparation of 2-methyl-4-sec-butyl thiazol-5-one: N-thioacetylisoleucine (12.2 grams) was dissolved in tetrahydrofuran (50 milliliters) and to this solution was added dropwise a solution of phosphorous tribromide (18.5 grams) in tetrahydrofuran (25 milliliters). The white precipitate formed was filtered off, washed, dried and suspended in dichloromethane (50 milliliters). Aqueous sodium bicarbonate solution was added to the suspension until its pH reached 8. The organic layer was separated, dried over anhydrous magnesium sulfate and the solvent removed under reduced pressure to leave the thiazolone as a pale yellow oil.

(b) Carbamoylation of 2-methyl-4-sec-butyl thiazol-5-one: 2-methyl-4-sec-butyl thiazol-5-one (4.25 grams, prepared as in (a)), and dimethylcarbamoyl chloride (2.7 grams) in pyridine (27 milliliters) were allowed to stand at room temperature for 16 hours. The solution was then diluted with ether and washed well with water. The ether layer was dried over anhydrous magnesium sulfate and the solvent removed under reduced pressure. The resulting brown oil was distilled in vacuo to yield the desired N,N-dimethylcarbamate as an oil boiling at 122° C. at 0.9 torr.

EXAMPLE III 2-isopropoxy-4-isopropylthiazol-5-yl, N,N-dimethylcarbamate (a) Preparation of 2-isopropoxy-4-isopropylthiazol-5-one: Isopropyl - (1 - carboxyisobutyl)thionocarbamate (15.5 grams) in dry tetrahydrofuran (70 milliliters) was mixed with dicyclohexylcarbodiimide (15.5 grams) in tetrahydrofuran (70 milliliters) and the mixture was allowed to stand for two hours at room temperature. The mixture was then filtered and the filtrate evaporated under reduced pressure. The residue was taken up in ether and the solution filtered and evaporated to leave a brown oil which was purified by distillation to give the thiazolone as a colorless oil boiling point 60° C. at 0.7 torr.

(b) Carbamoylation of 2 - isopropoxy - 4 - isopropylthiazol-5-one: 2-isopropoxy-4-isopropylthiazol-5-one (2.0 grams) was added with stirring to a cooled suspension of sodium hydride (0.5 grams as 50% dispersion in oil) in dry tetrahydrofuran (20 milliliters). Dimethyl carbamoyl chloride (1.12 grams) was added and the mixture was stirred for 16 hours at room temperature. The mixture was then filtered and the filtrate evaporated under reduced pressure. The residue was dissolved in ether and the solution was washed with dilute hydrochloric acid and saturated sodium bicarbonate solution, dried and evaporated under reduced pressure. The residue was chromatographed on silica gel using a 10:1 mixture of benzene and ethyl acetate to yield the desired product as a pale yellow oil.

EXAMPLE IV

Following procedure similar to those of Examples I–III further compounds were prepared, whose physical characteristics are set forth in Table I.

sugar as food for the flies, and the percentage of dead and moribund individuals was then recorded.

II. A quantity of 0.1 milliliters of a 1.0% by weight solution of the compound to be tested in acetone was mixed in a beaker with 100 milliliters of water. Twenty 5–6 day old (4th instar) mosquito larvae (*Aedes aegypti*) were added and the beakers stored for 24 hours. The percentage of dead and moribund larvae was then recorded.

III. The compounds were formulated as solutions or suspensions in water containing 20% by weight of acetone and 0.05% by weight of Triton X 100 as wetting agent. The formulations contained 0.7% by weight of the compound to be tested. Turnip and broad bean plants, trimmed to one leaf each, were sprayed on the under surface of the leaf with the above formulation. Spraying was effected with a spraying machine delivering 450 liters per hectare the plants passing under the spray on a moving belt. Ten 4th instar (8 day old) diamond-back moth larvae (*Plutella maculipennis*) or ten adult 1–2 week old mustard beetles (*Phaedon-cochleariae*) were placed on the sprayed leaf of each turnip plant and ten apterous (6 day old) vetch aphids (*Megoura viciae*) were placed on the sprayed leaf of each broad bean plant. The plants were then enclosed in glass cylinders fitted at one end with a muslin cap. Mortality counts were made after 24 hours.

IV. In tests against glass house spider mites (*Tetranychus urticae*) leaf discs cut from French bean plants were

TABLE I

| Compound | Melting point, ° C. |
|---|---|
| 4-isopropyl-2-methylthizaol-5-yl N-methylcarbamate | 74–75. |
| 4-isopropyl-2-methylthiazol-5-yl N,N-dimethyl carbamate | Oil $\nu_{C-O}$ 1745 cm.$^{-1}$. |
| 4-isopropyl-2-methylthiothiazol-5-yl N,N-dimethylcarbamate | Oil $\nu_{C-O}$ 1740 cm.$^{-1}$. |
| 2-methyl-4-sec-butylthiazol-5-yl N-methylcarbamate | 72–73. |
| 2-methylthiazol-5-yl N-methylcarbamate | 106 (dec.). |
| 2-methyl-4-(2-methylthioethyl) thiazol-5-yl N,N-dimethylcarbamate | Boiling point 152°/1 torr. |
| 2-methyl-4-(2-methylthioethyl) thiazol-5-yl N-methylcarbamate | 90–94. |
| 4-isopropyl-2-phenylthiazol-5-yl N-methylcarbamate | 130. |
| 4-isopropyl-2-phenylthiazol-5-yl N,N-dimethylcarbamate | 86. |
| 4-(2-methylthioethyl)-2-phenylthiazol-5-yl N-methylcarbamate | 101–102. |
| 4-(2-methylthioethyl)-2-phenylthiazol-5-yl N,N-dimethylcarbamate | 52–53. |
| 4-isopropyl-2-tert-butylthiazol-5-yl N-methylcarbamate | Oil $\nu_{C-O}$ 1740 cm.$^{-1}$. |
| 2,4-diphenylthiazol-5-yl N-methylcarbamate | 120–121. |
| 2,4-diphenylthiazol-5-yl N,N-dimethylcarbamate | 122–123. |
| 2-methyl-4-phenylthiazol-5-yl N,N-dimethylcarbamate | 70. |
| 2-methyl-4-methylthiothiazol-5-yl N-methylcarbamate | 80–81. |
| 2-methyl-4-methylthiothiazol-5-yl N,N-dimethylcarbamate | 55. |
| 2-isopropyl-4-secbutylthiazol-5-yl N-methylcarbamate | 38–39. |
| 2-isopropyl-4-secbutylthiazol-5-yl N,N-dimethylcarbamate | Oil $\nu_{C-O}$ 1740 cm.$^{-1}$. |
| 2,4-diisopropylthiazol-5-yl N-methylcarbamate | 30. |
| 2,4-diisopropylthiazol-5-yl N,N-dimethylcarbamate | Oil $\nu_{C-O}$ 1740 cm.$^{-1}$. |
| 2-methyl-4-(2-methyl-1,3-dioxolan-2-yl)thiazol-5-yl N,N-dimethylcarbamate | 81. |
| 2,4-dimethylthiazol-5-yl N,N-dimethylcarbamate | 38–39. |
| 2-methyl-4-(2-cyanoethylthio)thiazol-5-yl N,N-dimethylcarbamate | 52–53. |
| 2-methyl-4-propylthizaol-5-yl N-methylcarbamate | 48–50. |
| 2-methyl-4-propylthiazol-5-yl N,N-dimethylcarbamate | Oil $\nu_{C-O}$ 1740 cm.$^{-1}$. |
| 2-methyl-4-hexylthiazol-5-yl N-methylcarbamate | Oil $\nu_{C-O}$ 1740 cm.$^{-1}$. |
| 2-methyl-4-hexylthiazol-5-yl N,N-dimethylcarbamate | Oil $\nu_{C-O}$ 1740 cm.$^{-1}$. |

EXAMPLE V

Insecticidal and acaricidal activity

The insecticidal and acaricidal activity of the compounds of the invention was tested as follows:

I. A 1.0% by weight solution in acetone of the compound to be tested was prepared, and taken up in a micrometer syringe. Two to three day old adult female house flies (*Musca domestica*) were anaesthetized with carbon dioxide, and a 1 microliter drop of the test solution was brushed off on the ventrale abdomen of each, 20 flies being treated. The treated flies were held for 24 hours in glass jars, each containing a little granulated sprayed in the manner described under III. One hour after spraying, the discs were inoculated with 10 adult mites. Mortality counts were made 24 hours after inoculation.

V. In tests against large white butterfly larvae (*Pieris brassicae*) leaf discs cut from cabbage leaves were sprayed in the manner described under III. Ten 3rd instar (8–10 day old) larvae were placed on the discs within petri-dish pairs. Mortality counts were made 24 hours after inoculation.

The results of these tests are given in Table II wherein A denotes complete kill, B some kill and C no kill on the test insects.

TABLE II

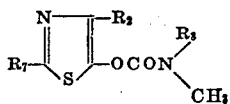

| R1 | R2 | R3 | M. domestica | A. aegypti | P. cochleariae | P. maculipennis | P. brassicae | M. viciae | T. urticae |
|---|---|---|---|---|---|---|---|---|---|
| $CH_3$ | $CH(CH_3)_2$ | H | A | C | A | B | B | A | A |
| $CH_3$ | $CH(CH_3)_2$ | $CH_3$ | A | C | B | C | A | A | B |
| $CH_3S$ | $CH(CH_3)_2$ | H | A | C | C | C | — | A | C |
| $CH_3S$ | $CH(CH_3)_2$ | $CH_3$ | A | C | C | C | — | A | C |
| $CH_3$ | $CH(CH_3)C_2H_5$ | H | A | C | A | B | C | A | C |
| $CH_3$ | $CH(CH_3)C_2H_5$ | $CH_3$ | C | C | A | B | A | A | C |
| $CH_3$ | $CH_2CH_2SCH_3$ | $CH_3$ | B | B | C | C | B | A | A |
| $CH_3$ | $CH_2CH_2SCH_3$ | H | C | C | C | C | C | A | A |
| $C_6H_5$ | $CH(CH_3)_2$ | H | C | B | C | C | A | B | C |
| $C_6H_5$ | $CH_2CH_2SCH_3$ | H | C | C | C | B | C | A | B |
| $C_6H_5$ | $CH_2CH_2SCH_3$ | $CH_3$ | C | C | C | C | A | C | B |
| $(CH_3)_3C$ | $CH(CH_3)_2$ | H | A | C | C | C | B | C | A |
| $CH_3$ | $C_6H_5$ | $CH_3$ | C | C | C | C | — | A | C |
| $CH_3$ | $SCH_3$ | H | C | C | C | C | C | A | C |
| $CH_3$ | $SCH_3$ | $CH_3$ | A | C | A | C | B | A | A |
| $(CH_3)_2CH$ | $CH(CH_3)C_2H_5$ | H | A | C | B | C | B | A | A |
| $(CH_3)_2CH$ | $CH(CH_3)C_2H_5$ | $CH_3$ | A | C | B | C | B | A | B |
| $(CH_3)_2CH$ | $CH(CH_3)_2$ | H | A | C | C | B | B | A | A |
| $(CH_3)_2CH$ | $CH(CH_3)_2$ | $CH_3$ | A | C | C | C | A | A | B |
| $CH_3$ | 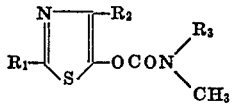 | $CH_3$ | A | C | B | C | B | A | C |
| $CH_3$ | $CH_3$ | $CH_3$ | C | C | B | C | A | A | C |
| $CH_3CHO$ | $CH(CH_3)_2$ | $CH_3$ | A | C | C | C | B | A | C |
| $CH_3$ | $SCH_2CH_2CN$ | $CH_3$ | A | C | C | C | A | A | C |
| $CH_3$ | $CH_2CH_2CH_3$ | H | A | B | B | B | C | B | A |
| $CH_3$ | $CH_2CH_2CH_3$ | $CH_3$ | B | C | B | C | A | A | B |
| $CH_3$ | $(CH_2)_5CH_3$ | H | B | C | C | C | B | A | A |
| $CH_3$ | $(CH_2)_5CH_3$ | $CH_3$ | C | C | C | C | C | A | A |

We claim as our invention:

1. A thiazole carbamate of the formula $$\text{structure: } R_1\text{-thiazole ring with } R_2 \text{ and } OCON(CH_3)R_3$$

wherein $R_1$ is methyl, isopropyl, or methylthio and $R_3$ is hydrogen or methyl, and when $R_1$ is methyl then $R_2$ is isopropyl, sec-butyl, methylthioethyl, methylthio, propyl or hexyl, when $R_1$ is isopropyl then $R_2$ is sec-butyl or isopropyl and when $R_1$ is methylthio then $R_2$ is isopropyl.

2. A compound according to claim 1 wherein $R_1$ is methyl, $R_2$ is isopropyl and $R_3$ is hydrogen.

3. 2-Methyl-4-sec-butyl-1,3-thiazol-5-yl N,N-dimethyl carbamate.

References Cited

UNITED STATES PATENTS 2,681,914  6/1954  Gysin et al. _____ 260—302 R

RICHARD J. GALLAGHER, Primary Examiner

U.S. Cl. X.R.

260—302 H, 306.7; 424—270